United States Patent [19]

Potenza

[11] 3,800,155

[45] Mar. 26, 1974

[54] AUTOMATIC USED BANKNOTES SELECTING MACHINE

[76] Inventor: Franco Potenza, Via Visconte Di Modrone 27, 20122 Milan, Italy

[22] Filed: May 31, 1973

[21] Appl. No.: 365,588

[30] Foreign Application Priority Data
May 31, 1972  Italy.................................. 25071/72

[52] U.S. Cl...................... 250/557, 194/4, 209/75
[51] Int. Cl. ............. B07c, G01n 21/30, G07f 1/06
[58] Field of Search.............. 250/219 DQ; 340/149; 356/71; 209/75; 194/4

[56] References Cited
UNITED STATES PATENTS

| | | | |
|---|---|---|---|
| 2,950,799 | 8/1960 | Timms | 250/219 DQ |
| 3,090,485 | 5/1963 | Moore | 209/75 |
| 3,235,074 | 2/1966 | Moore | 209/75 |
| 3,265,205 | 8/1966 | Chumley | 209/75 |
| 3,275,138 | 7/1966 | Cahill | 209/75 X |
| 3,706,374 | 12/1972 | Ptacek | 209/75 |
| 3,715,031 | 2/1973 | Okkonen | 209/75 |

Primary Examiner—James W. Lawrence
Assistant Examiner—T. N. Grigsby
Attorney, Agent, or Firm—Michael S. Striker

[57] ABSTRACT

An automatic used banknotes selecting machine, including a container for the banknotes, provided with an inclined surface, a suction device for picking up the individual banknotes from said container, cooperating with a shaped head, guides provided with pairs of rollers and pairs of superposed tracks, a feeling device for checking the thickness of the banknotes having an irregular thickness, in a separate container, an electronic apparatus, adapted to check the fluorescence of the banknotes, a photoelectric cell device adapted to measure the length of the banknotes, two pairs of belts, driven by a plurality of toothed wheels, journalled in vertical plates, an apparatus provided with a piezoelectric head for detecting and counting the rougness of the banknotes' printed designs, a photometric device for checking the watermark of the banknotes; an apparatus affecting the stretching and the alignment of the banknotes, an electronic, apparatus, connected to a pair of photometers, combined with a scanning head, inspecting the sample banknote and the banknote to be examined, respectively, at both faces of the banknotes themselves, a reading head for reading the serial numbers, consisting of a common reader of optical characters, a multi-case selecting device, in the cases of which there are conveyed both regular banknotes and banknotes selected as to their various defects.

13 Claims, 6 Drawing Figures

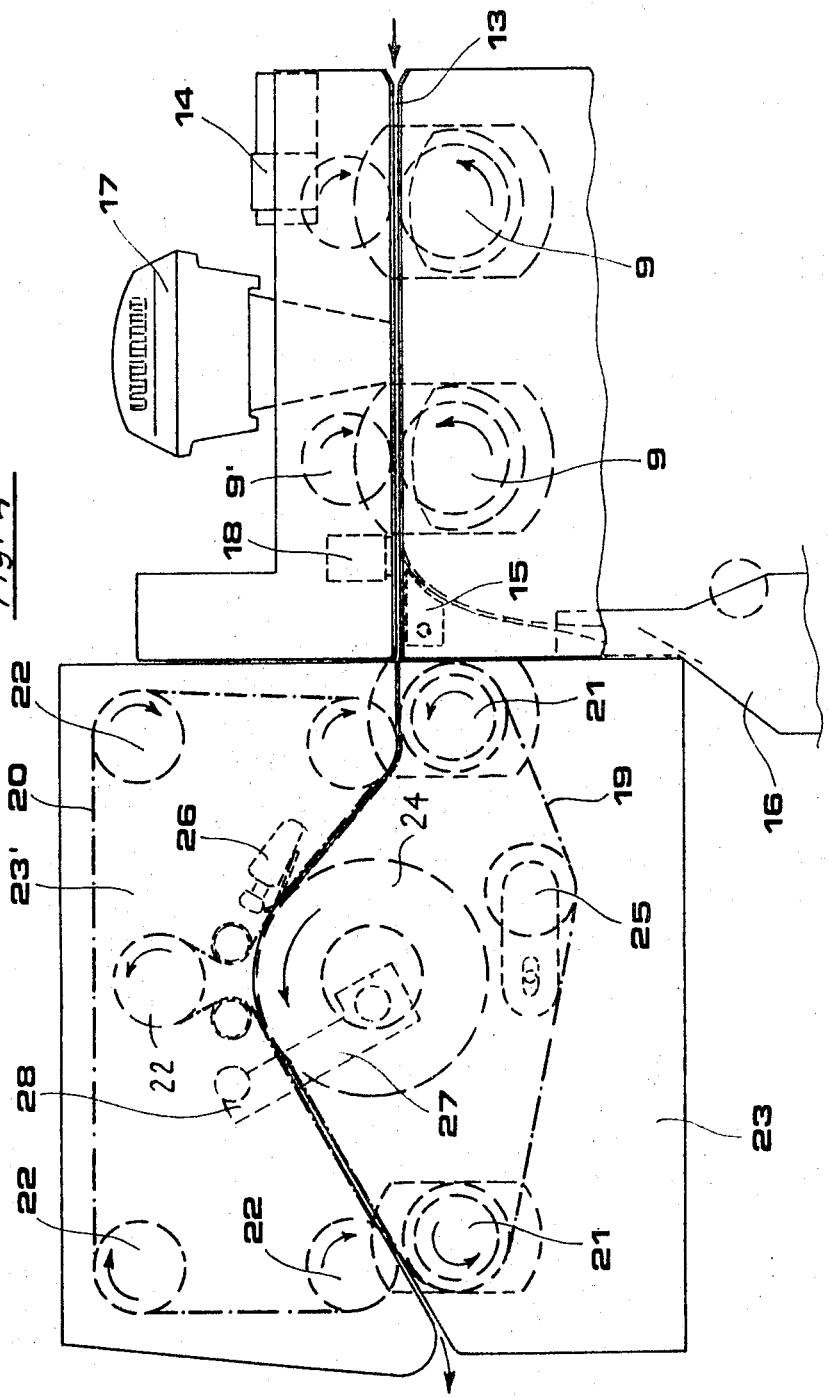

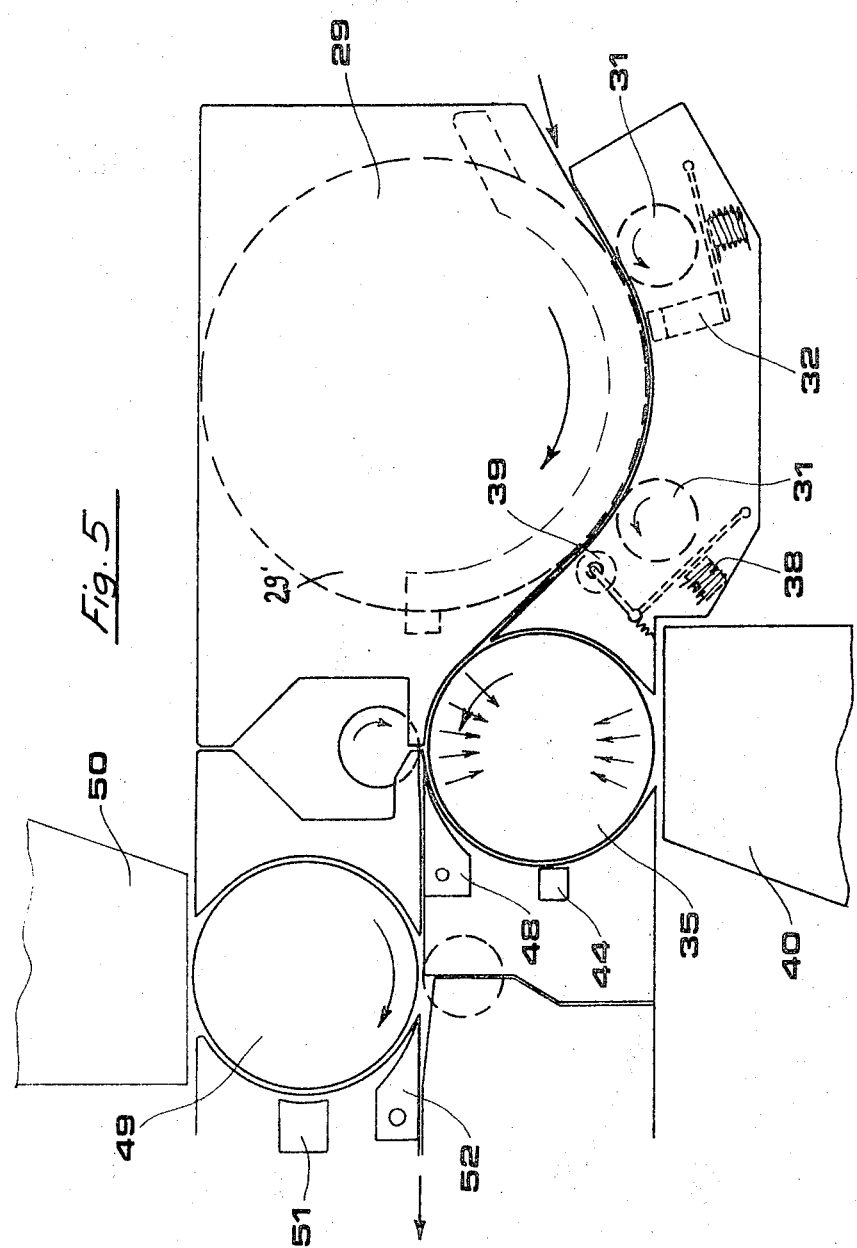

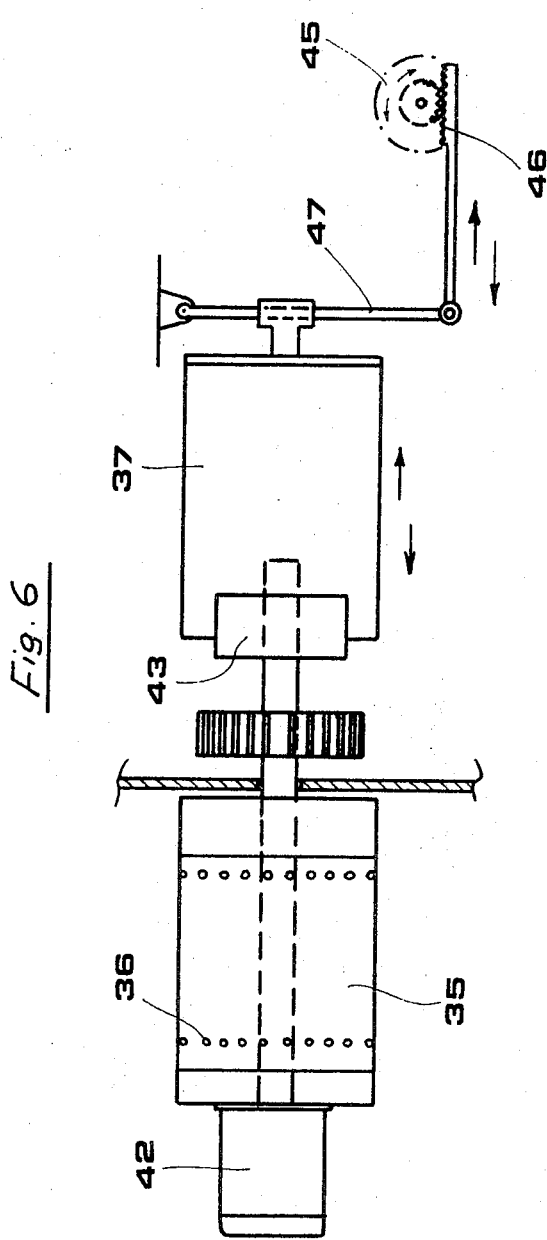

AUTOMATIC USED BANKNOTES SELECTING MACHINE

This invention relates to a machine adapted to automatically select used banknotes so as to distinguish among them those the physical condition of which is still such as to enable them to be brought back into circulation from those being instead so deteriorated as to suggest their destruction; the same selecting machine is also capable to detect amongst the selected banknotes any forged banknotes.

As well known, the selection of used banknotes, which are periodically sent to the central banks to check for their deterioration condition is visually carried out by experienced personnel.

Such hand inspection involves obviously a selecting work based on largely subjective criteria, turning out further most expensive.

The methodical search for possible forged banknotes brings about further a considerable extension of the dead times with a consequent reduction in the effective performance of each indivudual operator.

The above-outlined inconveniences are instead remedied by the automatic selecting machine according to the present invention.

Said selecting machine is in fact provided with a series of devices adapted to ensure an objective check of the banknotes' appearance and to ensure whether they are genuine banknotes or not.

More accurately, the selecting machine of this invention includes a feeder, adapted to insert the individual banknotes in a succession order into a special conveyor.

Said banknotes sliding along said conveyor are preliminary checked by an electro-mechanical device, measuring their thickness with a view to eliminating both any double banknotes and banknotes on which there is applied adhesive tape.

As a matter of fact, the latter could have been skillfully used for connecting to each other two portions of different banknotes according to a mode sometimes performed, permitting to obtain $n+1$ banknotes of one n-series.

The instant selecting machine provides in fact to detect the fluorescence characteristics of the banknotes and to exactly measure the length still with a view to identifying forged banknotes.

For the same purpose, the selecting machine of this invention is provided further with a device for checking the copper-plate printing and an apparatus adapted to detect the presence and the width of the watermark stretches.

Thereafter, the banknotes are compared via special scanning heads with the opposite faces of two sample banknotes.

In this manner, it is possible to detect according to a strictly objectuve criterion the appearance of the individual banknotes which the instant machine provides to separate with reference to specific deterioration levels as to re-utilizable banknotes and banknotes to be sent to the wastes.

Downstream of said scanning heads there may be also disposed a device for reading the serial numbers of the banknotes themselves.

The selecting machine according to the present invention includes finally a series of cases in which there are accomodated the examined banknotes, separated by the discrimination operated by the aforesaid checking devices.

These and further characteristic features of a functional and construction nature of the automatic used banknotes selecting machine according to this invention could be better understood from the following detailed description taken in conjunction with the various figures of the accompanying drawings, in which:

FIG. 4 represents a section of the instant machine relating to the group of devices participating in the identification of any forged banknotes;

FIG. 5 shows a section of the selecting machine relating to the groups effecting the optical comparison between used banknotes and a sample banknotes; and FIG. 6 shows a top view of the two rotary drums acting as support means for the banknotes being examined and a sample banknote.

Figure 1:
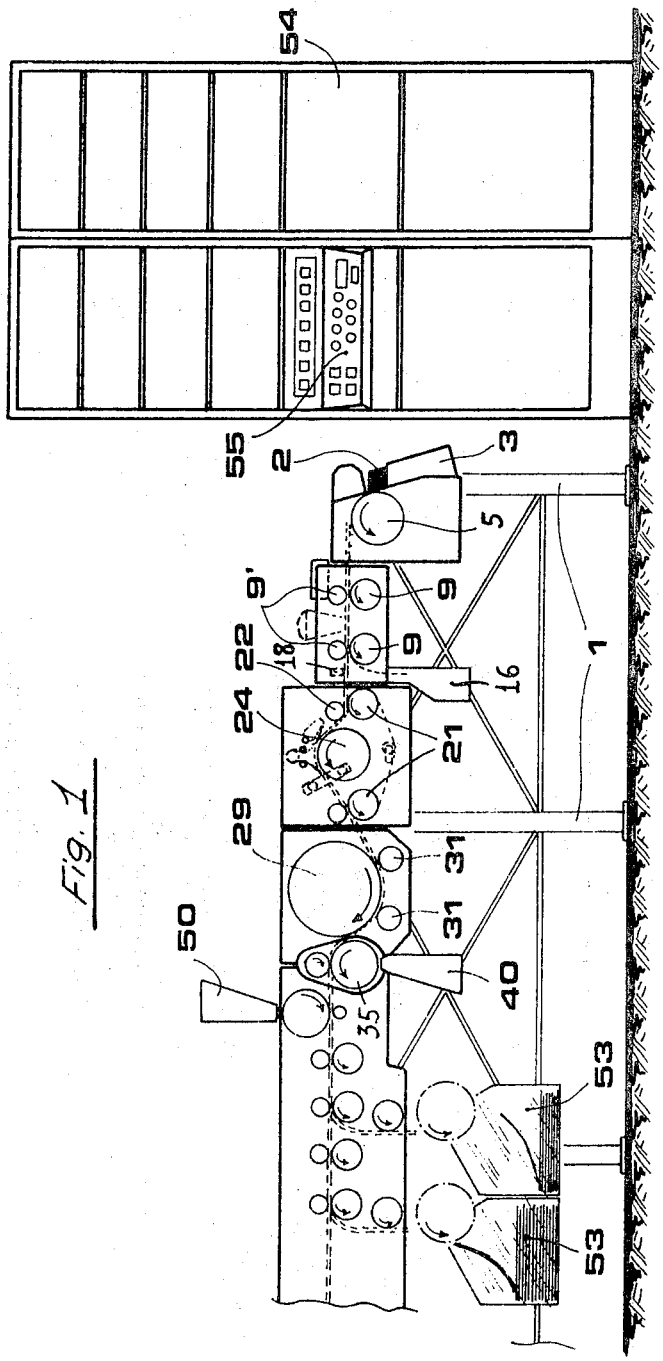
FIG. 1 shows said selecting machine represented schematically in its overall structure.
Figure 2:
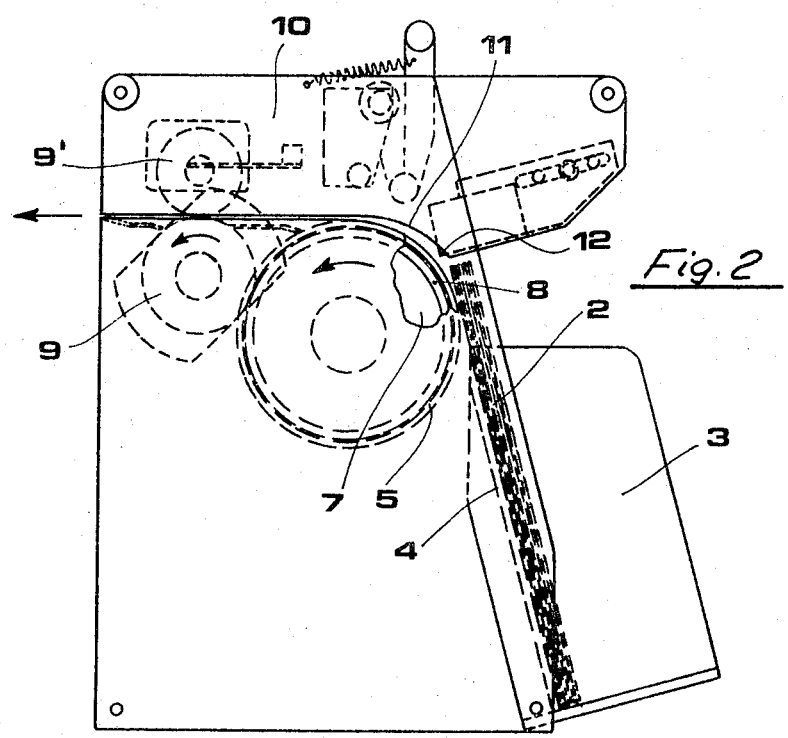
FIG. 2 represents designed the vertical section of the feeder device.
Figure 3:
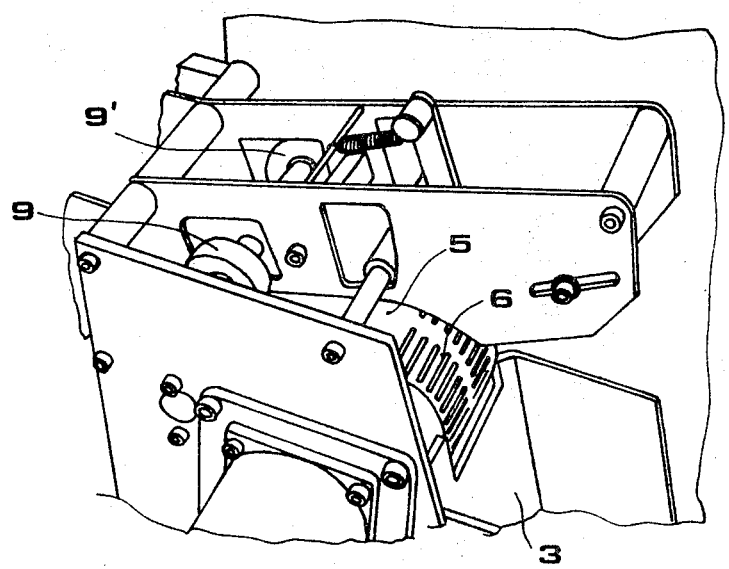
FIG. 3 shows the same feeder device in a perspective view.

Referring now particularly to the numeral symbols of the various figures on the accompanying drawings, the selecting machine of this invention consists of a carrying structure 1 along which there are disposed, in a succession order, a plurality of electro-mechanical and electronic apparatuses, carrying out the examination of the used banknotes.

The latter, being arranged so as to build a bundle 2, are placed inside a container 3, provided with an inclined surface 4, against which the banknotes themselves rest.

Said container 3 is placed at one end of the machine and is so dimensioned that the upper portion of the banknotes is tangent to a drum 5.

The aforesaid drum (5) is provided with windows (6) and fitted over a hollow cylindrical body (7) showing a radial opening (8).

Through a suction action, the first banknote in the bundle adheres to the rotary drum (5) a quarter of rotation and is sucked upwardly.

Subsequently, the front part of the banknote is released and inserts itself into special guides, being grasped by two pairs of rollers 9 and 9', one of which is provided with uniform rotary motion.

Inasmuch as to the first banknote, driven by the drum 5 may, however, adhere due to the suction or other contingent causes, one or more adjacent banknotes, above the rotary drum 5 itself there is disposed a shaped head 10.

Said shaped head 10 shows at its wall 11, facing the drum 5, a plurality of steps 12, adapted to retain the banknotes being possibly driven by the first one.

The banknote, shifted by the rotary drum 5, is being pushed by a plurality of rollers 9 and 9' along the guides 3 fitted internally with pairs of superposed tracks.

Along the run of said guides there is disposed a feeling device 14, adapted to effect the checking of the banknote thickness.

The aforesaid feeling device consists of a position detector or a similar device, adapted to measure with sufficient accuracy the thickness of the banknote being examined.

Should such feeling device detect an anomaly in the thickness of the banknote, it provokes the operation of a special switch 15, which by drawing out the banknote itself from the guides 13, sends it into a container 16 for further checks. It should be stressed in fact that any anomaly ascertained by the feeling device 14 may be imputable to both the passage of two (or more) superposed banknotes and the presence of pieces of adhesive tape on a banknote.

Along the run of the same guides 13 there is further disposed an electronic apparatus 17, adapted to identify any fluorescence characteristics shown by the banknotes.

Some of these in fact are made from non-fluorescent paper, so that the emission of radiation by the banknote may constitute a proof of falsity of the banknotes themselves.

The aforesaid detecting apparatus includes essentially an ultra-violet ray lamp, which projects a wave beam through a special filter, adapted to seleet the desired radiation.

A second filter separates any fluorescence radiation, as emitted by the banknotes, from possible radiations due to special markings, engraved lawfully on the banknotes themselves.

Said suitably filtered radiation is sent to a photocell, which pilots an electronic circuit, conveniently built, adapted to discriminate the admitted radiation level. Thereafter, the banknotes are being conveyed underneath a device 18, preferably fitted with a photoelectric cell, which measures in longitudinally sense the banknotes themselves.

By such arrangement, it is possible to discriminate both the banknotes of different cut, gone incidentally into the bundle 2 and banknotes being shorter than normally as a result of imitation.

The banknotes are then grasped at the longitudinal edges between two pairs of small belts 19 and 20, which are conveniently overlapped over a length of their run.

More accurately, said belts move pairwise along two circuits, being driven by a plurality of toothed wheels 21 and 22, respectively, being suitably journalled into the pairs of vertical plates 23 and 23'.

The same belts 19 and 20 slide over a portion of an idle rotating drum 24 and are maintained in tension by one or more pairs of conveniently structurally built devices 25.

In the run path in which the banknotes are going to have to drum 24 as lower support means there is arranged an apparatus 26, adapted to perform the checking of the copper-plate printing engraved on the banknotes.

As well known, said printing is en relief and therefore it may be detected by means of a particular piezoelectric head, which converts the roughness of the watermark into a variable tension. The latter is sent to a special electronic apparatus, which amplifies and selects the signal, checking that it shows the required intensity. The same signal further should show a frequency corresponding to the vicinity of the watermark stretches and to the speed at which the banknotes slide.

It is likewise suitable to stress that the aforesaid electronic apparatus also performs the counting of the overall number of the en-relief or engraved stretches.

Thereafter, the banknotes are being examined through a photometric device, adapted to perform the watermark checking.

More accurately, said banknotes being individually conveyed by the pairs of belts referred to above, they are struck, on one face, by a blade of light emitted by a suitably built lighting apparatus 27.

Said blade of light shows dimensions being compatible with tha watermark stretch width and by getting across the banknote thickness, it reaches a photometer 28, which detects the opacity variations of the paper.

The transmission diagram, obtained by said photometer, is worked out via an electronic system, comparing it with a sample diagram.

Particularly, said electronic system is capable of determining the transmission difference from the minimum to the maximum and watermark stretch width. Said determination is carried out by means of a special synchronization at the zone whereat the watermark itself is located in the banknote.

It should be further specified that by changing the sensitiveness thresholds of the photometric apparatus, it is possible to discriminate between genuine watermarks and any imitation attempts.

The banknotes under examination are subsequently conveyed to an apparatus, adapted to perform a stretching and alignment action of the banknotes. Said apparatus consists of two coaxial rotary discs 29 and 29'.

Tangentially to the group made up of said members there are disposed two or more pairs of rollers 31, conveying the banknotes inserted between the conveniently built guides.

The same stretching and aligning apparatus includes an electro-magnetic brake 32, which may press the banknotes.

Downstream of the pair of discs 29 and 29' there is placed a drum 35.

Inside said drum there is formed a depression chamber, communicating with the outside by means of a plurality of holes 36, drilled in the thickness of the shell of the drum itself.

The same drum 35 is further partially surrounded by two cylindrical sectors, building guides for the passage of the banknotes on the drum itself. It should be noted at this stage that coaxially to the drum 35 there is disposed a second drum 37, on which there is fastened a sample banknote.

The rotation of said two drums under normal conditions is synchronized, so that one may perform a first alignment in transversal sense between the sample banknote and the banknote under examination, releasing the latter from the brake 32, when the front edges of the banknotes lie over one and the same line.

Said operation may be carried out by means of photoelectric cells, controlling the opening of the brake 32 and simultaneously feeding the circuit of an electromagnet 38. Said electromagnet causes the two rotary pliers (39) and (39') to come close to the discs (29) and (29'), thereby easing the feed of the banknote, already engaged by the drum (35).

The banknote under examination and the sample banknote are then compared with each other by one single scanning head 40, brushing their faces in sight, obviously corresponding to the purpose of making sure the deterioration condition of said banknotes being examined.

To this end, the system takes avail of a motor (42), piloted by a digit control, governed by the signals of two photoelectric cells (44), aligned along the two drums (35) and (37).

The signals provided by said two photoelectric cells (44) ensure to move forward and back by means of the motor 42 the drum 37 so as to perfectly align the front edges of the two banknotes.

It should be noted here in this connection that the differential group 43 by which it is possible to vary the longitudinal alignment of the banknotes is essentially made up of two epicyclic gearings, dimensioned so as to avoid plays.

The cross alignment between the banknotes themselves is obtained by means of a second step-by-step motor 45, which acts on a rack 46.

The latter is articulated with an arm 47 — pivoted to a fixed point— to which there journalled the axis of the drum 37.

The aforementioned step-by-step motor 45 is driven by the pulses provided by an electronic apparatus, which processes the data transmitted by a pair of photometers, combined with the scanning head 40. In practice, said scanning head emits two luminous spots, which inspect respectively the banknote under examination and the sample banknote.

The reflected spots are being examined by two photometers, which can detect the relative displacement in a transversal sense of the printed portion of the sample banknote relative to that of the banknote being examined.

Said suitably processed difference in phase is translated into a series of pulses conveyed to second step-by-step motor 45, which effects the cross adjustment of the drum 37 and then of the sample banknote relative to the banknote under examination.

It should be specified that the aforementioned adjustment may be of unique character, should the banknote under examination appear parallel to the sample banknote.

The same adjustment may be instead of continuous character, if the two banknotes are disposed on the respective drums according to converging axes. The reflection of the two spots on the printed portion of the banknotes is in turn intercepted by the aforementioned two photometers, which detect the difference in luminosity between the individual points of the banknote under examination and the sample banknote.

By interpreting such difference as an extent of the local alteration of the used banknote relative to the sample banknote several defect types are ascertained in the used banknote, such for example as outs, discolorations, spots, missing parts and the like.

It is also advisable to note that the electonic system effecting the comparison between the measures of the two photometers may be conveniently adapted depending on the individual requirements.

Said adaptation may be performed by means of an adjustment controlled by the operator and variable to change separately the sensitiveness threshold of each of the aforesaid defects.

Should one of the banknotes exced the threshold of a determined tolerance, it is sent consequently to the wastes.

After such examination, relating to one of its faces, the banknote is detached from the drum 35 by the action of a blade 48 and is conveyed to a second drum 49, being part of a symmetrical system and similar to the former one.

By means of the aforementioned system, provided in turn with a scanning head 50 and a photocell 51 for the longitudinal alignment of the banknote under examination relative to the sample banknote the opposite face of the same banknote is submitted to an analysis.

Subsequent to said investigation, the banknote is being detached from the drum 49 by the action of the blade 52.

Downstream of the drum 49 there is disposed, preferably, a reading head for the serial numbers, consisting of a common reader of optical characters. Said reading head sends the read number to an electronic memory of an automatic computer, effecting the storing of the passage of the same serial number. The selecting machine of this invention comprises further a plurality of cases 53 to effect the collection of the banknotes, separated by the discrimination of the various examining devices.

The sending of the individual banknotes to the appropriate case is controlled by the operation of the same discriminating devices, which act on special diverting mechanisms.

It should be noted further that all electronic apparatuses having a processing and control duty, are preferably enclosed inside a special cabinet 54, provided with a bracket 55.

From the foregoing specification and from perusal of the various figures on the accompanying drawings one may easily see the great functional character and the practical application, characterizing the automatic used banknotes selecting machine according to the present invention.

Obviously, said selecting machine and related manufacturing and functional method have been formerly described and represented by way of non-limiting example and to demonstrate the practical accomplishment of the general features of the present invention.

From the above considerations it may be consequently inferred that the automatic selecting machine of this invention and related method may undergo several changes and modifications according to the different manufacturing conveniences and specific practical application provided from time to time for said selecting machine, as well as any such improvements as would be suggested by practical experience.

Said changes and modifications might refer to both the aforementioned functional parts being characteristical of this invention and their construction particularities and or mounting characteristics, all without departing from the scope of the present invention.

What we claim is:

1. An automatic used banknotes selecting machine, including a container for the banknotes, provided with an inclined surface, a suction device for picking up the individual banknotes from said container, cooperating with a shaped head, guides provided with pairs of rollers and two pairs of superposed tracks, a feeling device for checking the thickness of the banknotes having an irregular thickness, in a separate container, en electronic apparatus, adapted to check the fluorescence of the banknotes, a photoelectric cell device adapted to measure the length of the banknotes, two pairs of belts, driven by a plurality of toothed wheels, journalled in vertical plates, an apparatus provided with a piezoelectric head for detecting and counting the roughness of the banknotes' printed designs, a photometric device for checking the watermark of the banknotes; an apparatus effecting the stretching and the alignment of the banknotes, an electronic apparatus, connected to a pair of photometers, combined with a scanning head, inspecting the sample banknote and the banknotes themselves, a reading head for reading the serial numbers, consisting of a common reader of optical characters, a multicase selecting device, in the cases of which there are conveyed both regular banknotes and banknotes selected as to their various defects.

2. An automatic used banknotes selecting machine as defined in claim 1, wherein the said container, adapted to contain banknote bundles, is provided with an inclined surface and dimensioned so that the upper portion of the banknotes be tangent to a rotary drum, showing a sector in which there are formed longitudinal windows, said drum being fitted over a hollow cylindrical body, which is maintained in depression and provided with a radial opening.

3. An automatic used banknotes selecting machine as defined in claim 1, wherein there are provided guides for the banknotes, fitted internally with two pairs of superposed tracks, cooperating with two pairs of rollers and a shaped and hinged head.

4. An automatic used banknotes selecting machine as defined in claim 1, wherein there is provided a feeling device for checking the banknotes' thickness, consisting of a position detector, which may actuate a changeover or switching device, conveying the irregular banknotes into a special container.

5. An automatic used banknotes selecting machine as defined in claim 1, wherein the said electronic apparatus, adapted to check the fluorescence of the banknotes, comprises an ultra-violet ray lamp, projecting a wave beam through a filter, adapted to select the required radiation, whereas a second filter separates any fluorescence radiation emitted by the banknote from possible radiations resulting from special markings, lawfully applied on the banknotes themselves, whilst said suitably filtered radiation is sent to a photoelectric cell, which pilots an electronic circuit, adapted to discriminate the admitted radiation level.

6. An automatic used banknotes selecting machine as defined in claim 1, wherein there is provided a pair of belts, superposed over a length of their path, which move pairwise on two circuits and are driven by a plurality of toothed teeth, journalled into pairs of vertical plates, whilst said belts slide over a portion of drum, rotating and idle, and are maintained in tension by one or more pairs of stretching devices.

7. An automatic used banknotes selecting machine as defined in claim 1, wherein there is provided an apparatus for checking the copper-plate printing applied on the banknotes, provided with a piezoelectric head, which converts the roughness of the watermark into a variable tension, which is sent to an apparatus, which amplifies and selects the signal, checking that this shows the required intensity.

8. An automatic used banknotes selecting machine as defined in claim 1, wherein there is provided a lighting device, which emits a light blade, getting through the banknotes' thickness and reaches a photometer, which detects the opacity variations of the paper and compares it through an electronic system with a sample diagram.

9. An automatic used banknotes selecting machine as defined in claim 1, wherein there is provided an electromagnetic brake and photoelectric cells, which control the opening of the brake by means of an electromagnet, causing two rotary pliers to come close to the discs.

10. An automatic banknotes selecting machine as defined in claim 1, wherein there is provided a scanning head, which sweeps the visible faces of the banknotes and is powered by a motor, piloted by a digit control, governed by the signals of two photoelectric cells, aligned along the two drums.

11. An automatic banknotes selecting machine as defined in claim 1, wherein there is provided a differential group, consisting of two epicyclic gearings and a motor, which acts on a rack, articulating with an arm, pivoted into a fixed point, to which there is journalled the axis of the drum, the said motor being actuated by the pulses provided by an electronic apparatus, processing the data transmitted by a pair of photometers, combined with a scanning head.

12. An automatic banknotes selecting machine as defined in claim 1, wherein there is provided a blade for the detachment of the banknotes, a scanning head, a photocell and another blade, whilst downstream of said latter drum there is fitted a reader of optical numbers.

13. An automatic banknotes selecting machine as defined in claim 1, wherein there are provided cases, fitted with diverting devices.

* * * * *